United States Patent Office 3,188,440
Patented June 8, 1965

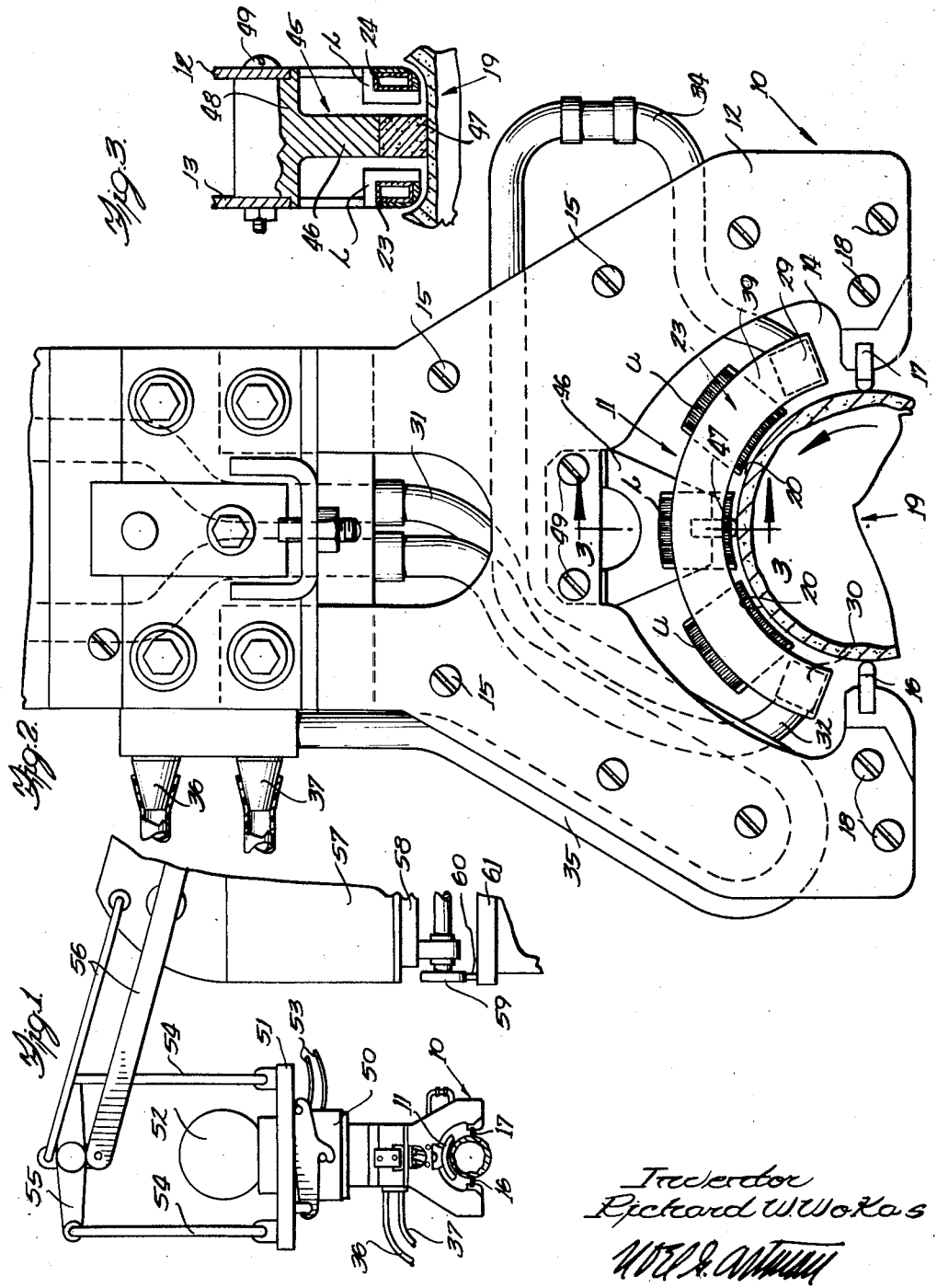

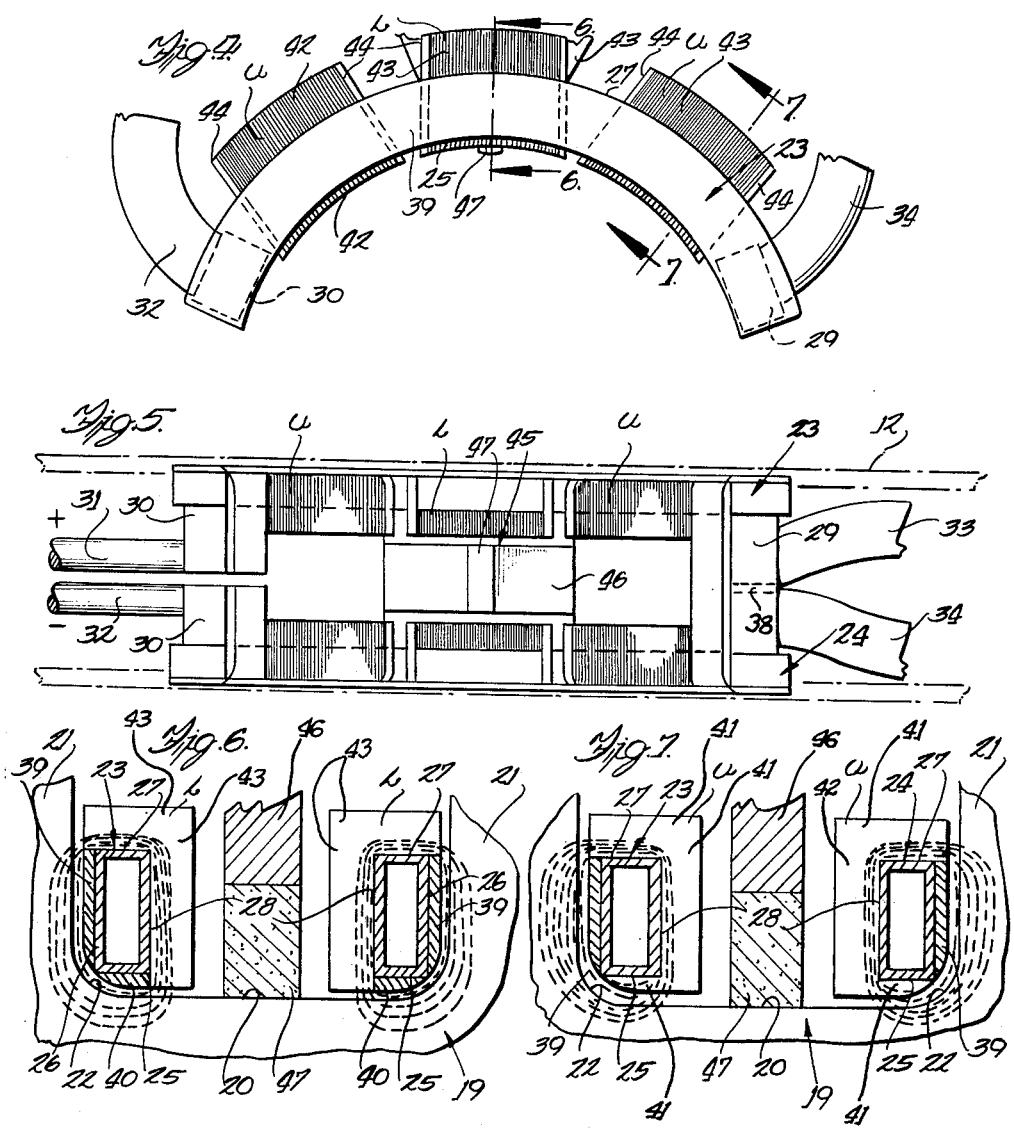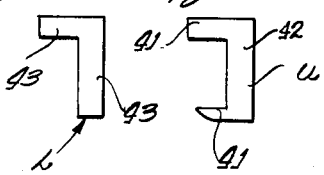

3,188,440
HIGH FREQUENCY INDUCTOR ASSEMBLY
Richard W. Wokas, Cicero, Ill., assignor to International Harvester Company, Chicago, Ill., a corporation of New Jersey
Filed Dec. 26, 1962, Ser. No. 247,236
3 Claims. (Cl. 219—10.43)

This invention pertains to the art of high frequency induction heating and more particularly pertains to an inductor assembly particularly adapted for heating crankshaft bearings and fillets prior to a quench-hardening operation.

The inductor of the present invention is primarily concerned with the hardening of crankshaft bearings, and fillets which are formed at the opposite ends of the bearings and which extend into circumferential projections of the crankshaft which are known in the field as "cheeks" or "webs." The induction heating and hardening of fillets of crankshafts has been accomplished before by various inductor constructions, one of which is described in the C.A. Tudbury Patent No. 2,761,048 issued August 28, 1956. With the increase in size and horsepower requirements of internal combustion engines one of the main problems has been premature failures of crankshafts. Due to severe bending moments causing exceptionally high stresses in the fillet areas cracks and rapid deterioration of the crankshaft results in early failure. Realizing this problem, it has been determined, as indicated in the afore-mentioned patent, that it is also desirable to harden not only the fillet area itself but portions of the adjacent cheek in order to materially increase the strength in this particular weak area. Thus, with the type of inductor disclosed in the afore-mentioned patent, it was possible to adequately harden a fillet, the crankshaft bearing surface and portions of the cheek. The industry therefore has been able to harden the bearing surface and several of the fillets satisfactorily. However, when it has been attempted to harden all of the fillets of a crankshaft it was found that this was impractical since extreme distortion would take place in the crankshaft which would thus make it unacceptable for use and service. As a result, it has been the practice in the industry to harden only a few of the fillets of a crankshaft in order to prevent distortion of the crankshaft. The prime object of the present invention is to provide an improved inductor which will induction heat the fillets and adjacent projections in a manner wherein distortion of the crankshaft is reduced so that all of the fillets of a crankshaft can be induction hardened.

It is another object of the invention to provide an improved single-loop inductor having comparatively short width so as to confine the heat to only a small portion of a rotating crankshaft, the said inductor having magnetic laminations disposed thereon to effectively induce heat in all the fillet areas and adjacent cheeks of the crankshaft whereby a minimum of distortion occurs upon the quenching of the crankshaft.

A still further object of the invention is to provide an improved inductor for induction heating the fillets of a crankshaft and the adjacent cheeks or circumferential projections of said crankshaft wherein side conductors of the inductor include a disposition of magnetic laminations, some of which provide for greater induced heating depth in the circumferential projections.

It is another object of this invention to provide an improved inductor wherein side conductors of the inductor are provided with a large number of U-shaped laminations which direct a high concentration of power or magnetic field deep into the adjacent cheek area of the fillets, the said inductor also including L-shaped laminations which primarily induce a greater heating depth in the fillet per se.

It is still a further object to provide an improved heating inductor for induction heating, a crankshaft bearing surface, fillet, and adjacent cheek surfaces, the said inductor including a pair of substantially parallel side conductors each having two stacks of spaced U-shaped laminations supported thereon and a stack of L-shaped laminations therebetween whereby the U-shaped laminations provide for an induced heat area of greater depth in the cheeks of the crankshaft and the L-shaped laminations provide for an induced greater depth in the fillet areas of the crankshaft.

A still further object is to provide an improved inductor of a single-loop configuration, including side conductors, end conductors and a spacer member positioned to project between and through said conductors for positioning the conductors relative to a crankshaft bearing surface, said side conductors immediately adjacent said spacer member having a plurality of magnetic laminations effectively reducing the heat to which the guide member is subjected to, thus acting to shield the guide member from the magnetic currents.

These and other objects will become more readily apparent from a reading of the specification when examined in connection with the accompanying sheets of drawings, in which:

FIGURE 1 is a side elevational view of an improved inductor positioned in heating relation to a crankshaft and supported on components of an induction-heating apparatus;

FIGURE 2 is an enlarged side elevational view of a high-frequency inductor assembly;

FIGURE 3 is a cross sectional view taken substantially along the line 3—3 of FIGURE 2;

FIGURE 4 is a detailed side elevational view of an inductor assembly;

FIGURE 5 is a bottom view of the inductor shown in FIGURE 4;

FIGURE 6 is an enlarged cross sectional view taken substantially along the line 6—6 of FIGURE 4;

FIGURE 7 is an enlarged cross sectional view taken substantially along the line 7—7 of FIGURE 4;

FIGURE 8 is a detailed view of an L-shaped magnetic lamination; and

FIGURE 9 is a detailed view of a U-shaped magnetic lamination.

Generally the present inductor may be readily applied to an inductor assembly of the type shown in the G. Seulen et al. Patent No. 2,743,345, issued April 24, 1956. The preferred embodiment of the inductor is of a single-loop or single-coil type having a pair of substantially parallel extending side conductor members connected at one end by a transversely-extending conductor and having at its other end a pair of relatively short transversely extending conductors to which copper tubing elements are connected and which extend to a source of high-frequency power. The conductors are all of tubular construction so that cooling water may be passed therethrough in conventional fashion. The side conductors of the inductor are of arcuate shape so as to conform generally to the bearing surface of a crankshaft to be hardened. The inductor assembly, to which the inductor is connected, also includes spaced plates provided at their lower ends with recesses to form a space generally conforming to the crankshaft surfaces to be hardened, the said plates also including at their lower ends a pair of guide members extending inwardly for engaging the bearing surface of a crankshaft in order to position the inductor centrally of the axis of rotation of the crankshaft. The inductor assembly further includes a center guide which projects downwardly from the plates of the inductor assembly, in between the side conductors and end conductors and projects outwardly therefrom with a guide member engaging the bearing surface to be hardened and for spacing the inductor vertically relative to the crankshaft bearing surface. Two pairs or two stacks of U-shaped laminations are supported on the side conductors and one stack of L-shaped laminations is supported on the side conductors between the U-shaped laminations. The transversely-extending conductors are effective to induce heat in the bearing surfaces between the end fillets of the crankshaft bearings. The side conductors provide for the induction heating of the crankshaft fillets and the adjacent cheeks or circumferential projecting areas of the crankshaft. The U-shaped laminations are so positioned on the side conductors so as to direct the magnetic field into the cheeks or circumferential projections to produce a relatively deep pattern, with a lesser amount of induced heating in the fillet area. On the other hand, the L-shaped laminations are positioned on the side conductors so as to induce a greater heating depth in the fillet portions of the crankshaft with a lesser depth of induced heating in the cheeks. The magnetic laminations are generally made of silicon steel and serve the additional purpose of shielding the center guide from extensive induced heating so as to increase the wear life of the inductor assembly.

Referring now to the drawings, a high-frequency inductor assembly is generally designated by the reference character 10. The inductor assembly 10 comprises a high-frequency inductor element designated at 11 which is carried on a pair of side plates 12 and 13. The side plates 12 and 13 are recessed at their lower ends to provide a space or pocket designated at 14. The side plates 12 and 13 are suitably connected by means of screw assemblies 15. The lower ends of the side plates 12 and 13 are provided to support spaced guide members 16 and 17 projecting toward each other, as shown in FIGURE 2, and being suitably supported on the plates 12 and 13 by means of bolt and nut assemblies 18. A crankshaft is designated at 19, the said crankshaft having bearing surfaces 20. The term "bearing surfaces 20" may either refer to the pin bearings of a crankshaft or may refer to the main bearings otherwise known as "journals" of a crankshaft. The crankshaft 19 also is provided at opposite ends of the bearings with circumferentially-extending projections which are generally known as "cheeks" or "webs" designated at 21. The corners formed by the cheeks 21 with the bearing surfaces are known as "fillets" or "fillet areas" designated at 22, and it is these portions which are subjected to extreme stresses and which in many instances are cracked during the stress resulting from bending moments on the crankshaft during use in the internal combustion engine.

Referring now particularly to FIGURES 2, 4 and 5 the high-frequency inductor element 11 comprises a pair of hollow side conductors 23 and 24 disposed generally parallel with respect to each other. Each side conductor 23 has an outer bearing facing side 25 and an outer cheek facing side 26. Further, each side conductor 23 and 24 has an inner side 27 and 28. As shown in FIGURE 5 the right-hand ends of the side conductor members 23 and 24 are connected by means of an end conductor 29 also of tubular shape. The left-hand ends of the side conductors 23 and 24 are connected by short end conductors 30 which are not interconnected. Copper tubes 31 and 32 are respectively connected to each conductor 30 and the end conductor 29 is also connected to copper tubes 23 and 24. Since the side conductors 23, 24 and end conductors 29 and 30 are of tubular construction they are able to receive cooling liquid through tubes 31 and 32 for cooling the inductor and such cooling liquid is discharged through tubes 33 and 34 which, in turn, communicate with tubes 35, only one of which is shown, the said tubes in turn being connected to outlets 36 and 37 for discharging the liquid from the inductor assembly.

As best shown in FIGURE 5 the end conductor 29 also is partitioned by means of a baffle 38 so that separate liquid flow is provided from the conductors 23 and 24 respectively through the tubes 33 and 34. The tubes 31 and 32 also are adapted to be connected suitably to a high-frequency power source which will be described hereafter.

The outer cheek facing sides 26 of the side conductors 23 and 24 have connected thereto copper strips 39. Likewise the outer bearing facing sides 25 have connected thereto copper strips 40. Copper strips 39 and 40 provide for greater conductivity of the high-frequency power to accentuate the induced heating in the areas to which they are adjacent.

The side conductors 23 and 24 have supported thereon two stacks of U-shaped magnetic laminations as best shown in FIGURES 4 and 5. A U-shaped lamination is best shown in FIGURE 9 and comprises legs 41 perpendicular to a connecting portion 42. As shown in FIGURE 7 the legs 41 straddle the conductors 23 and 24 with the one leg 41 engaging the outer bearing facing side 25 and the other leg engaging the inner side 27 with the connecting portion 42 also engaging the inner side 28 of each side conductor. A stack of L-shaped laminations designated by L, as shown in FIGURES 4 and 5, is positioned on each of the side conductors 23 and 24 between the stacks of U-shaped laminations. Each L-shaped lamination, as best shown in FIGURE 8, is provided with legs 43. As best shown in FIGURE 6 the L-shaped laminations are so positioned that their legs 43 engage the inner sides 27 and 28 of the side conductors. The U-shaped and L-shaped laminations may be made of silicon steel and there is a ratio of two U-shaped laminations for each L-shaped lamination as indicated by the stacks. The laminations are held in position on the side conductors by means of copper end pieces 44 as indicated.

FIGURES 2 and 3 show the position of a T-shaped center support generally designated at 45 as best shown in FIGURE 3. The center support 45 includes a central supporting member 46 having secured thereto at its lower ends, a ceramic guide 47. The center support 45 is integral at its upper end with a transversely extending connecting block 48 suitably connected between the side plates 12 and 13 by means of screw fasteners 49. The center support 45 projects downwardly centrally in the space 14 between the side conductors 24 and 25 and the ceramic guide 47, as best shown in FIGURE 2, engages the crankshaft bearing surfaces 20 to vertically space the inductor element 11 relative to said bearing surface to be heated. Thus, with the spacer guide 16 and 17 and the guide 47 the inductor assembly is properly spaced and positioned relative to the bearing to be heated so that the assembly may be supported upon the crankshaft bearing during rotation. Also, as best shown in FIGURES 2, 4 and 5 the center support 45 is shielded by the L-shaped laminations so that less heat is induced in said member and thus greater life may be obtained.

As best shown in FIGURE 1 the upper end of the inductor assembly is designated at 50 and the assembly is suitably connected to a hanger plate 51 in turn pivotally supported by means of links 54 which in turn are suitably pivotally connected to a transverse member 55. The transverse member 55 is supported by four parallel bars 56, only two of which are shown, the same in turn being pivotally supported on a housing designated at 57. Electrical wires 53 are adapted to connect to a high-frequency electrical power generator (not disclosed), and in turn are suitably connected to a transformer 52 supported on the hanger 51. In one reduction to practice of the invention a 10,000 cycle generator was used capable of delivering 165 kilowatts. The housing 57 is suitably supported on a carriage 58 having a plurality of wheels 59, only one of which is shown, which are adapted to be moved on a track 60 suitably supported on a portion of a quench tank 61. Thus the inductor with the carriage 58 may be moved parallel to the axis of a crankshaft for positioning the inductor in heating relation to the bearings. The construction of the links 54 and parallel links 56 is such that the inductors rests upon the bearing of the crankshaft to be heated and may move with said bearing as would be the case in a pin bearing which is, of course, eccentrically positioned with respect to the axis of the crankshaft. Thus, as the pin bearing moves in an orbital path and the inductor assembly will follow said movement.

In the operation, the inductor assembly 10 is lowered onto the bearing surface to be hardened which may be either a main or a pin bearing. The crankshaft 19 is rotating and the guides 16, 17 and 47 suitably support the inductor assembly and space the inductor element 11 in proper heat inducing relation. The end conductors 29 and 30 serve to induce heating in the bearing surfaces 20 and the side conductors 23 and 24 serve to induce heating in the cheeks 21 and fillets 22. In order to properly harden all of the fillets of a crankshaft without distortion and cracking of the shaft it is extremely important that the fillets and adjacent cheek portions be adequately and properly heated. This is accomplished by the positioning of the U-shaped stacks of laminations and the L-shaped stack positioned therebetween. As best shown in FIGURE 6 the L-shaped laminations are so disposed that the magnetic field is directed to heat the fillet areas to a greater depth than the cheek areas. As best shown in FIGURE 7 the U-shaped laminations provide a magnetic field in the cheek areas which extends deeper into the cheeks than into the fillet areas themselves. This, of course, is occasioned by the lower leg 41 which extends along the outer bearing surface sides 25 to direct the magnetic field primarily into the cheeks with a smaller induced area resulting in the fillets. On the other hand, the L-shaped laminations as shown in FIGURE 6 provide a magnetic field which extends particularly deep into the fillet areas to a much greater extent than in the cheeks. With this combination shown therefor effective fillet hardening and cheek hardening is provided which, in effect provides an evenness of heating which results in effective hardening after quenching without over-heating causing distortion or hair line cracks. By this combination of lamination placement therefor effective heating of the fillets as well as the cheek areas is assured and the resultant hardened crankshaft, with all fillets hardened is vastly superior to crankshafts hardened previously by induction hardening means. This has heretofore not been achieved in the industry.

The U-shaped laminations, by means of the legs, which straddle the side conductors carry the magnetic field directly into the cheeks with lesser heating taking place in the fillet areas. On the other hand, the L-shaped laminations serve to concentrate the heat in the fillets so that both the fillets and the cheek areas are effectively and uniformly heated which results in a minimum of distortion after quenching. Further, the disposition of the single guide member between the L-shaped laminations is ideal to provide an effective central support to secure proper spacing of the inductor element. Since the L-shaped laminations are positioned to shield the guide member greater life for the guide member is assured. Without the laminations the side conductors would induce a greater magnetic field in the guide member thereby over-heating the same whereby the use of the L-shaped lamination effects a shield to direct the current and magnetic field to the desired portions to be heated.

Thus, it is obvious that the objects of the invention have been fully achieved and modifications may be made without departing from the spirit of the invention as disclosed nor as defined in the appended claims.

What is claimed is:

1. An induction heating apparatus for induction heating crankshaft bearing surfaces and fillets located at opposite ends of said bearings between the surfaces and circumferential projections on said crankshaft; comprising an inductor having a pair of spaced parallel side conductors each including sides, one side facing said bearing surfaces and the other side facing said projections, an end conductor connecting said side conductors, means connecting said inductor to a source of high frequency electrical power, and first L-shaped magnetic laminations and second U-shaped magnetic laminations supported on each of said side conductors, said first laminations inducing a greater heated depth area in said fillets, the second laminations inducing a greater heated depth area in said projections, and guide means supported on said inductor between said laminations and projecting below certain of said laminations and for engaging a bearing surface and spacing said side conductors from said bearing surface.

2. An induction heating apparatus for induction heating crankshaft bearing surfaces and fillets located at opposite ends of said bearings between the surfaces and circumferential projections on said crankshaft,
   (a) a high frequency inductor for heating said surfaces and fillets including,
   (b) a pair of substantially parallel extending spaced side conductors each having inner and outer sides,
   (c) one outer side facing said bearing surface and
   (d) a second outer side facing said circumferential projections,
   (e) an end conductor extending transversely of and connecting said side conductors,
   (f) said end conductor having a bearing facing side,
   (g) means adapted to connect said inductor to a source of high frequency electrical power,
   (h) two stacks of U-shaped magnetic laminations supported on each said side conductor,
   (i) said U-shaped laminations each having one leg contacting the outer bearing facing side, and
   (j) another leg and a connecting portion contacting the inner sides of said side conductors,
   (k) a stack of L-shaped laminations on each side conductor disposed between said U-shaped laminations,
   (l) said L-shaped laminations contacting the inner sides of said side conductors,
   (m) whereby said L-shaped laminations induce greater depth of heating in said fillets and said U-shaped laminations induce greater depth of heating in said circumferential projections.

3. An inductor heating apparatus in accordance with claim 2, including a guide member disposed between the laminations on said side conductors, said guide members projecting from said inductor and for engaging and supporting the same on a bearing surface.

References Cited by the Examiner
UNITED STATES PATENTS 2,743,345 4/56 Seulen et al. _____ 219—10.43
2,761,048 8/56 Tudbury _____ 219—10.43

FOREIGN PATENTS 917,201 8/54 Germany.

RICHARD M. WOOD, *Primary Examiner.*